UNITED STATES PATENT OFFICE.

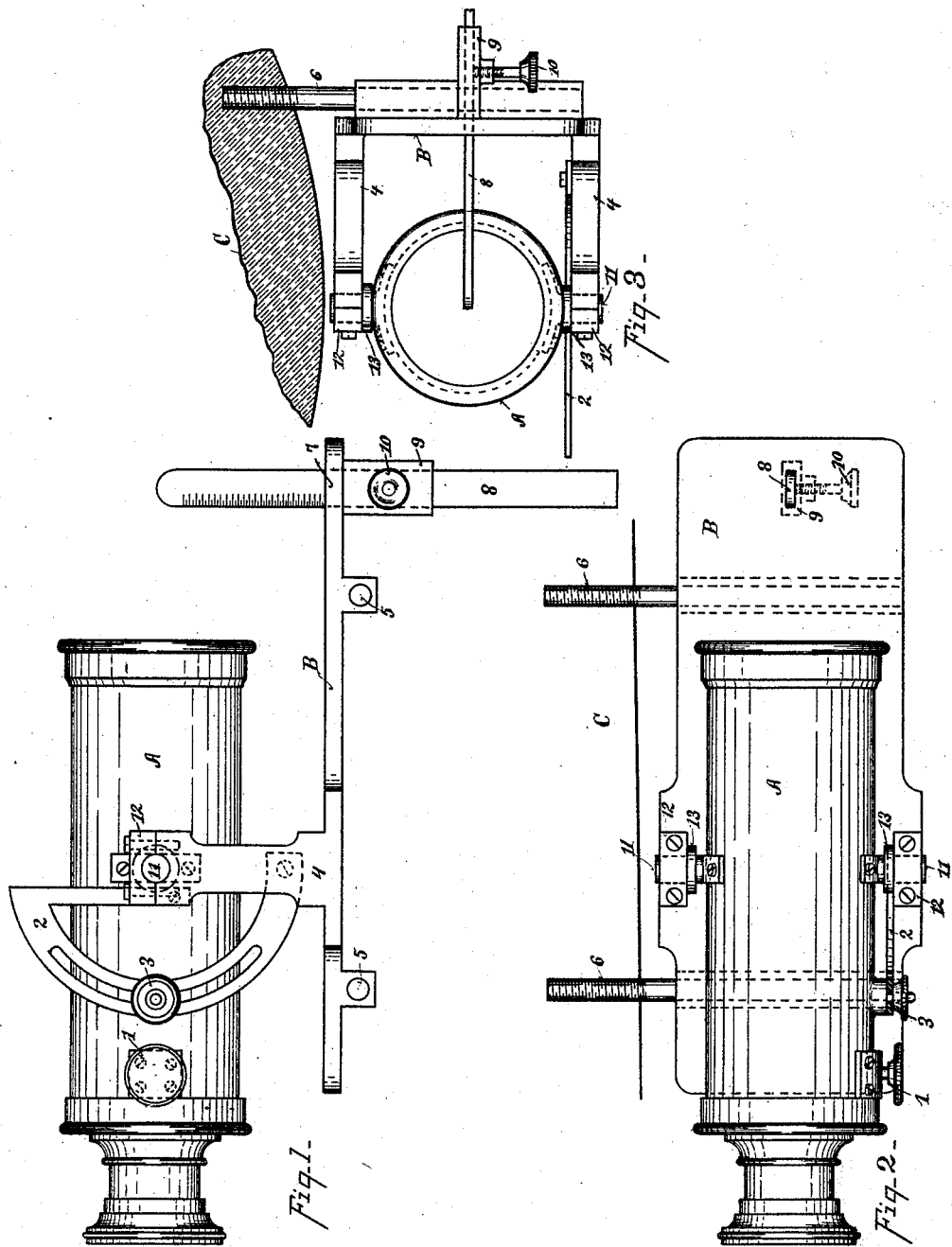

VALENTINE BERBERICH, OF FRANKFORT, KENTUCKY.

TELESCOPIC SIGHT FOR CANNON.

SPECIFICATION forming part of Letters Patent No. 484,285, dated October 11, 1892.

Application filed February 29, 1892. Serial No. 423,177. (No model.)

*To all whom it may concern:*

Be it known that I, VALENTINE BERBERICH, of Frankfort, in the county of Franklin and State of Kentucky, have invented a new and useful Improvement in Sights, of which the following is a specification.

My invention is an improvement in sights for cannon and rifles; and it consists in the novel constructions and combinations of parts hereinafter described, and pointed out in the claims.

In the drawings, Figure 1 is a side view, Fig. 2 a top view, and Fig. 3 a front end view, of my improvement, Figs. 2 and 3 representing it in connection with a part of a cannon.

The telescope A is provided with lenses of sufficient power to see from one to ten miles for cannon of the largest size, from one-half to three miles for field-guns, and from one hundred yards to one mile for rifles. The telescope is also provided with a screw 1, whereby it may be expanded or contracted. The frame or support includes a base B, having standards 4, provided with bearings 12 for the trunnions 11 of the telescope, and shoulders 13, fitting against said bearings, as shown. The frame is further provided with a slotted arc 2, which by the aid of clamp-nut 3 serves to retain the telescope in any desired adjustment. A scale or sight bar 8 is supported by the frame in the range of the telescope and has its pointed top formed to serve as the front sight. This sight 8 has degrees marked upon it and is preferably adjustable up and down through a slot 7 in the base B, a case-like box 9 being dropped from said base to steady the said sight and keep it perpendicular and a set-screw 10 serving to hold the sight 8 in any suitable adjustment. The instrument, except the telescope, may be made of hard metal, such as steel or iron. Where desired, the arc 2 may be graduated similarly to the sight 8 to permit an accurate adjustment of the telescope to any desired angle to the horizontal.

In practice the sight-instrument is supported alongside of the gun and conveniently detachable therefrom, so it can be taken off after sighting to prevent injury to the instrument by the vibrations. To this end I provide the frame with perforated portions 5, formed to slide on the rods 6, projecting laterally from the gun and so arranged that the instrument will be parallel with the bore of the gun.

In operation first slide the instrument onto the bars 6 6. Then adjust the telescope perfectly level and parallel with the bore of the gun and set the front sight 8 with its upper point even with the center of the lens of the telescope. This will give the point-blank range. To fire above point-blank, lower the bar 8 to the degree needed. Then lower the telescope by the arc movement to the same degree the front sight has been lowered. Then elevate the gun until the object to be fired at comes within the range of the front and back sights. To fire below point-blank, the operation may be reversed, as will be readily understood.

Having thus described my invention, what I claim as new, and desire to secure by Letters Patent, is—

1. A gun-sight comprising a frame, a telescope adjustably supported thereon, and a sight supported by said frame in the range of the telescope and adjustable independently of the telescope, substantially as set forth.

2. A gun-sight comprising a frame, a telescope, and a sight supported independently of the telescope and located in the range thereof, substantially as set forth.

3. In a gun-sight, the combination of a telescope adjustably supported, means for securing said telescope in any desired adjustment, a sight adjustably supported in the range of said telescope, and means for securing such sight in any desired adjustment, substantially as set forth.

4. In a gun-sight, the combination, with a suitable support, of a telescope, a sight in the range of said telescope, and a support or frame for said telescope and sight independently of the gun, substantially as set forth.

5. In a telescopic gun-sight, substantially as described, the telescope-supporting frame provided with a plurality of lateral openings adapted to receive rods projected from the side of the gun, whereby the sight may be conveniently applied to and removed from the gun, substantially as and for the purposes set forth.

6. The combination of the gun, the rods 6, projecting laterally from the gun, and the frame or support provided with the telescope and sight and having openings to slide on said rods 6, whereby the frame may be applied to and removed from the gun, substantially as set forth.

7. An improved sighting-instrument consisting of the frame having its base provided with slot 7 and with standards 4 and arc 2, the telescope journaled to the standards 4, means for securing said telescope in any desired adjustment to the arc 2, and the sight-bar 8, adjustable in the slot 7, all substantially as and for the purposes set forth.

VALENTINE BERBERICH.

Witnesses:
LOUIS WEITZEL,
JAMES W. LANE.